June 10, 1969 B. DAVIES ET AL 3,449,138
PHOSPHATE-IMPREGNATED MAGNESITE BRICK
Filed Jan. 9, 1967

INVENTORS
BEN DAVIES
GEORGE F. CARINI

BY
William C. ……
ATTORNEY

United States Patent Office 3,449,138
Patented June 10, 1969

3,449,138
PHOSPHATE-IMPREGNATED MAGNESITE BRICK
Ben Davies and George F. Carini, Pittsburgh, Pa., assignors to Dresser Industries, Inc., a corporation of Delaware
Filed Jan. 9, 1967, Ser. No. 607,993
Int. Cl. C04b 35/04
U.S. Cl. 106—58                                   5 Claims

ABSTRACT OF THE DISCLOSURE

Burned magnesite brick impregnated with a soluble phosphate which brick develop calcium sodium silicophosphate or calcium silicophosphate bonds on heating and methods of making said brick.

BACKGROUND

In recent work (copending application Ser. No. 555,734, filed June 7, 1966, entitled "Magnesite Refractories," by Davies and Carini, assigned to the same assignee as this case) now U.S. Patent No. 3,390,002, it was found that burned magnesite brick, having a calcium silicophosphate bond, could be manufactured and had increased high-temperature strength as measured by modulus of rupture. It has also been found (copending application Ser. No. 607,983, filed Jan. 9, 1967, now abandoned, entitled "Chemically Bonded Magnesite Brick" by Davies and Carini, assigned to the same assignee as this case) that unburned magnesite brick could be manufactured with a sodium phosphate binder which had extremely high strength as measured by modulus of rupture at elevated temperatures as a result of the formation in service of a calcium sodium silicophosphate bond. I have now discovered that it is possible to provide on heating a calcium-sodium silicophosphate or calcium silicophosphate bond in burned magnesite brick having controlled lime:silica ratios by impregnating the burned brick with a soluble phosphate.

Magnesite brick are manufactured substantially from dead burned magnesia which, in the refractories art, is termed magnesite. Ceramically bonded brick are those which are bonded by the sintering which takes place during a burning process.

BRIEF DESCRIPTION

This invention is predicated on the discovery that burned magnesite brick having a lime:silica ratio between 2:1 and 5:1, when impregnated with a controlled amount of soluble phosphate, developed a calcium-sodium silicophosphate or a calcium silicophosphate bond in service. According to this invention, burned magnesite brick containing at least 90% MgO and, preferably, 94% MgO and having a lime:silica ratio between 2:1 and 5:1 are impregnated with sufficient soluble phosphate such that the $CaO:SiO_2:P_2O_5$ ratio falls within area A–B–C–D–E on FIG. 1. Preferably, the magnesite brick should contain about 1% $CaO+SiO_2$, and up to 3% $R_2O_3$ oxides (viz., $Fe_2O_3$, $Cr_2O_3$, and $Al_2O_3$). Preferably, the $R_2O_3$ oxides are less than 1%.

DETAILED DESCRIPTION

Further features and other objects and advantages of this invention will become clear to those skilled in the art by a careful study of the following detailed description. In the detailed description, all percentages and ratios and parts are by weight; chemical analyses were obtained by spectrographic analysis with control by wet chemical analysis, and are reported as oxides in accordance with the present practice of the refractories industry.

Figure 1:
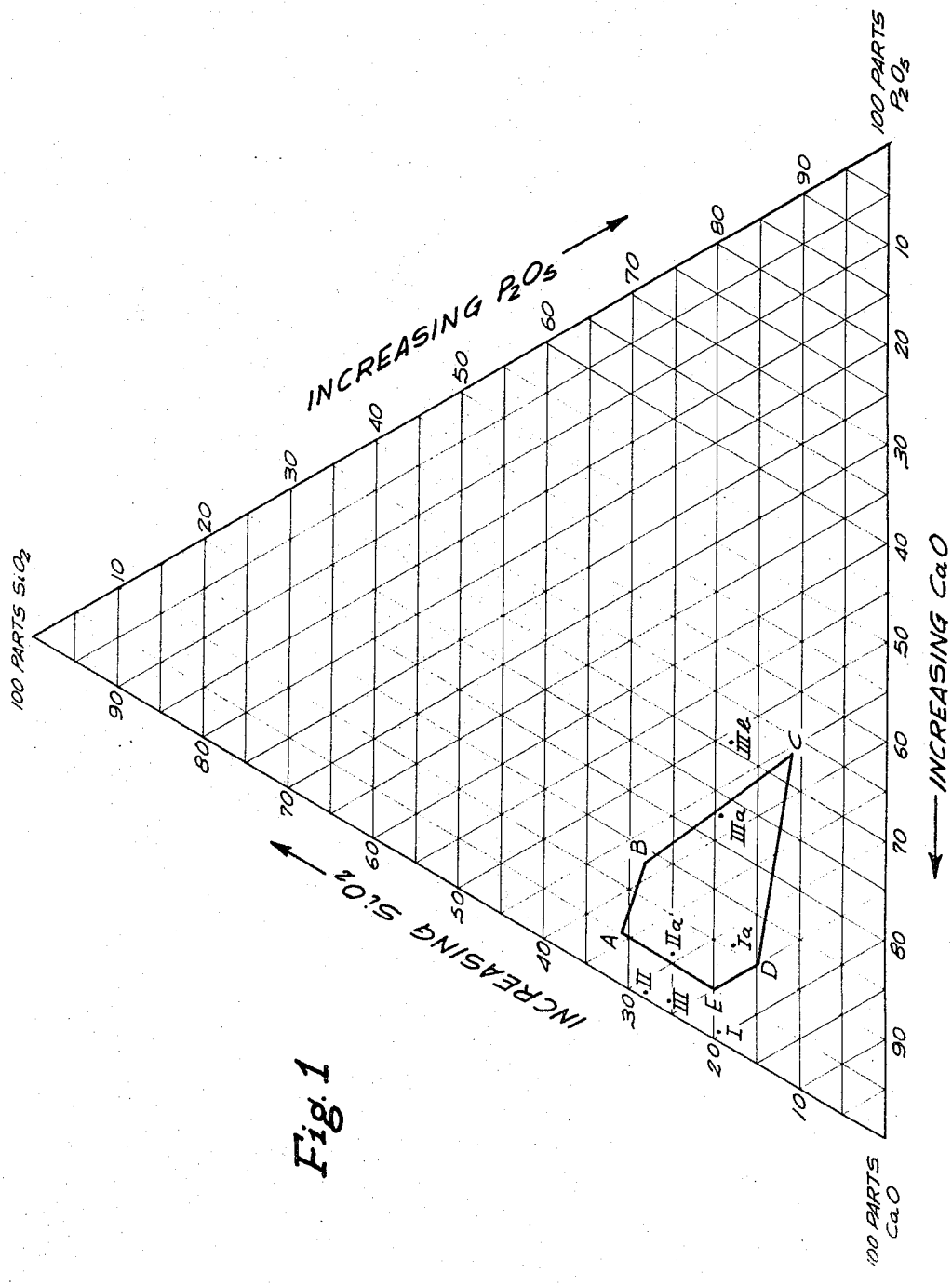
FIG. 1 is a ternary diagram which graphically shows the $CaO:SiO_2:P_2O_5$ weight ratios which are suitable for phosphate-impregnated magnesite brick made according to this invention.

The detailed discussion is made with reference to the FIG. 1, which is a ternary diagram on which the relative proportions of CaO, $SiO_2$, and $P_2O_5$ of the exemplary mixes are plotted. Proportions were calculated from the chemical analyses without reference to MgO or other oxides, the major components of the refractory which, of course, have no influence on proportions of the CaO, $SiO_2$, and $P_2O_5$.

The diagram utilizes the principles which characterize all such three-component systems. In the diagram, each side of an equilateral triangle was divided into 100 parts, each fifth part being intersected by a line parallel to each of the other two sides. A point at each corner represents 100 parts, by weight, of one of the three components. For example, in a diagram the apex represents 100 parts of $SiO_2$; the lower left-hand corner represents 100 parts of CaO; and the lower right-hand corner represents 100 parts of $P_2O_5$. In any ternary diagram, the three sides are binary systems. For example, the point on the base line is composed exclusively of the lower corner components CaO and $P_2O_5$. The relative distance of a point from each of the three corners may be expressed in parts; and it, thus, may represent a proportion composition of a ternary mixture. All points on a line through one of the corners must have the same ratio of the components of the other two corners.

A series of burned magnesite brick was prepared (Examples I, II and III) as shown in Table I. The brick had different lime:silica ratios. Their chemical analyses are also shown in Table I. Several brick of each example were

TABLE

| Example No. | I | Ia | II | IIa | III | IIIa | IIIb |
|---|---|---|---|---|---|---|---|
| Impregnation | None | | None | | None | | |
| Solution of metaphosphate glass, strength of solution, percent | | 25 | | 25 | | 25 | 37.5 |
| Chemical analysis, percent (after testing at 2,300° F.): | | | | | | | |
| Silica ($SiO_2$) | 0.84 | 0.84 | 1.8 | 1.7 | 1.0 | 1.0 | 0.96 |
| Alumina ($Al_2O_3$) | 0.30 | 0.32 | 0.61 | 0.66 | 0.37 | 0.37 | 0.38 |
| Iron ($Fe_2O_3$) | 0.52 | 0.60 | 1.6 | 1.6 | 0.46 | 0.46 | 0.44 |
| Lime (CaO) | 3.4 | 3.4 | 4.6 | 4.6 | 3.0 | 2.9 | 2.7 |
| Magnesia (MgO) | The remainder | | | | | | |
| Phosphorous Oxide ($P_2O_5$) | 0.05 | 0.5 | 0.05 | 0.40 | 0.05 | 1.2 | 1.6 |
| Boron Oxide ($B_2O_3$) | 0.12 | 0.09 | 0.13 | 0.09 | 0.10 | 0.10 | 0.10 |
| Modulus of rupture,[1] p.s.i.: | | | | | | | |
| At 2,300° F | 520 | 1,700 | 470 | 890 | 1,110 | 1,980 | 680 |
| At 2,600° F | 160 | 1,220 | 80 | 240 | | | |
| At 2,700° F | | | | | 220 | 610 | 250 |

[1] Modulus of rupture was measured substantially according to ASTM Method C133-55, Manual of ASTM Standards on Refractory Materials, 9th edition, (1963), pages 145 et seq., except that the test was performed in an electrically-heated furnace. In no case is the depth of the test samples less than 1½ inches.

tested without impregnating for hot strength (modulus of rupture) at 2300° F. and at 2600° F. or 2700° F. Other brick (Examples Ia, IIa, and IIIa) were impregnated with a 25% solution of a sodium metaphosphate glass. Thereafter, they were dried at about 250° F. for about 10 hours. These impregnated brick also were tested for hot tensile strength. The chemical analyses after testing at 2300° F. is shown for the impregnated brick. Brick according to Example III were also impregnated with a 37.5% solution of a sodium metaphosphate glass (Example IIIb) and subjected to the same tests as the other brick.

The preceding table establishes that impregnating with a soluble phosphate increases the strength of magnesite brick at elevated temperatures two or threefold, or even more. The best mode now known for the practice of this invention is embodied in Example Ia. Notice that Examples Ia and IIIa have moduli of ruptures in excess of 500 p.s.i. at temperatures of 2600° F. or higher. Example IIIb was impregnated with too much phosphate and, therefore, does not have the proper $CaO:SiO_2:P_2O_5$ ratio to develop calcium silicophosphates in service.

The lime:silica ratios of the magnesite brick are critical. Brick having lime:silica ratios of less than 2:1 do not develop hot strength on impregnating with phosphates. Brick having lime:silica ratios in excess of 5:1 are very difficult to manufacture because of their tendency to hydrate.

According to this invention, it is permissible to impregnate with any soluble phosphate which includes, among others, the sodium phosphate glasses and the sodium phosphate salts and phosphoric acid. However, the amount of $P_2O_5$ added is critical. The $CaO:SiO_2:P_2O_5$ ratio must be controlled if high-temperature strength is to be obtained.

While I do not completely understand the scientific basis of the invention, I believe phosphate impregnation imparts high-temperature strength to burned magnesite brick by the development on heating of a calcium sodium silicophosphate or a calcium silicophosphate bond. A calcium sodium silicophosphate solid solution is developed in reactions between sodium phosphate and calcium silicates, calcium silicates containing calcium phosphates in solid solution, or calcium silicophosphates at relatively low temperatures (below 2300° F.). The solid state reaction is aided apparently by the reaction-accelerating effect of the sodium cation. The refractoriness of the system is apparently not affected detrimentally by the limited presence of sodium. Sodium enters the calcium silicophosphate structure filling calcium vacancies in the lattice which are unoccupied because of the difference in valence between $SiO_4$ and $PO_4$ groups. In effect, the sodium ions are isolated and not available for reaction with other components to form low-melting compounds. The structure of the calcium sodium silicophosphate solid solution is analogous to the high-temperature form of the calcium silicophosphate solid solution series.

Figure 2:
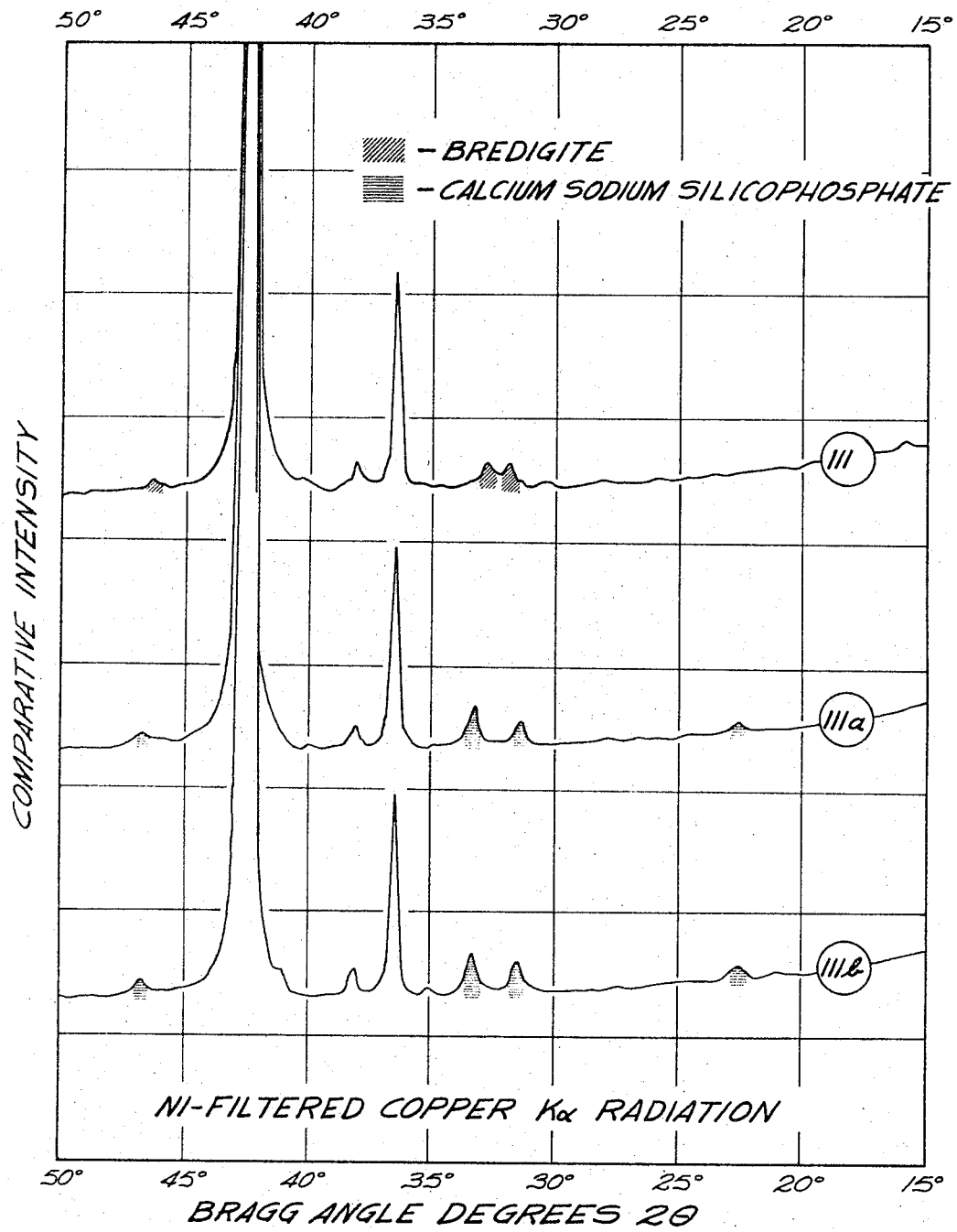
FIG. 2 contains an X-ray diffraction pattern of one of the examples hereinafter discussed.

X-ray diffraction studies were made of Examples III, IIIa, and IIIb after heating to 2300° F. to obtain a better understanding of this invention. The X-ray diffraction patterns are shown in FIG. 2. The predominant mineral phase (other than periclase represented by the two largest peaks) found in Example III was bredigite. Examples IIIa and IIIb, which were impregnated with sodium phosphate had a calcium sodium silicophosphate phase replacing the bredigite. Example IIIa, made according to this invention, has outstanding high-temperature strength, whereas Example IIIb does not. This demonstrates that formation of a calcium silicophosphate or calcium sodium silicophosphate phase is only part of the invention and that the $CaO:SiO_2:P_2O_5$ ratio of the phosphate phase is critical.

PHASE STUDIES

Standard X-ray powder diffraction procedures were followed in the qualitative determination of the phase composition of the refractory test specimens.

A General Electric XRD-5 X-ray Diffractometer unit equipped with spectrogoniometer, gas-flow proportional counter, and potentiometric strip-chart recorder was used. Powder mounts were scanned in the angular range 5° to 70° $2\theta$ using Ni-filtered Cu K$\alpha$ radiation. Instrument settings were: tube voltage 50 kv.; tube current 13.5–15.5 ma.; input discriminator 2.5 v.; beam slit 3°; receiving slit 0.2°; time constant 2 seconds; recorder range 2000 counts per second; and scanning speed 2° $2\theta$ per minute.

Interplanar ($d$) spacings and relative intensities of reflections were determined from diffraction patterns by calculation using tables of interplanar spacings as a function of $2\theta$ and by visual estimation with a calibrated scale. Identification of the diffracting phases was effected following a standardized procedure in which $d$ values and relative intensities were compared with published diffraction data and reference patterns. The primary reference source for powder diffraction data was the Powder Diffraction File, published by the American Society for Testing Materials (1964). The Numerical (Hanawalt), Alphabetical (Davey), and Fink indexes to the Powder Diffraction File were used. Additional diffraction data was obtained from published scientific papers.

Having thus described the invention in detail and with sufficient particularity as to enable those skilled in the art to practice it, what is desired to have protected by Letters Patent is set forth in the following claims.

We claim:
1. Burned magnesite brick consisting essentially of at least 90% MgO, at least 1% CaO+$SiO_2$, less than 3% $R_2O_3$ oxides, having a CaO:$SiO_2$ ratio between 2:1 and 5:1, impregnated with sufficient soluble phosphate such that the brick has a $CaO:SiO_2:P_2O_5$ ratio within area A–B–C–D–E on FIG. 1.

2. Brick according to claim 1 in which the $R_2O_3$ oxides are less than 1%.

3. Brick according to claim 1 comprising at least 94% MgO.

4. Brick according to claim 1 having a modulus of rupture at 2600° F. in excess of 500 p.s.i.

5. Method of improving the hot strength as measured by modulus of rupture of burned magnesite brick consisting essentially of 90% MgO, at least 1% CaO+$SiO_2$, less than 3% $R_2O_3$ oxides, having a CaO:$SiO_2$ ratio between 2:1 and 5:1, comprising impregnating the brick with sufficient soluble phosphate such that the brick have a $CaO:SiO_2:P_2O_5$ ratio within area A–B–C–D–E on FIG. 1.

References Cited

UNITED STATES PATENTS

| | | | |
|---|---|---|---|
| 2,947,649 | 8/1960 | Davies | 106—58 |
| 3,141,790 | 7/1964 | Davies et al. | 106—58 |

JAMES E. POER, *Primary Examiner.*

U.S. Cl. X.R.

106—63